(12) United States Patent
Chang et al.

(10) Patent No.: US 9,215,257 B2
(45) Date of Patent: Dec. 15, 2015

(54) TERMINAL DEVICE AND METHOD FOR EXCHANGING VOIP SIGNALING

(71) Applicant: HON HAI PRECISION INDUSTRY CO., LTD., New Taipei (TW)

(72) Inventors: Yao-Wen Chang, New Taipei (TW); Shin-Hsin Hsu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 181 days.

(21) Appl. No.: 13/873,256

(22) Filed: Apr. 30, 2013

(65) Prior Publication Data

US 2014/0146712 A1 May 29, 2014

(30) Foreign Application Priority Data

Nov. 27, 2012 (TW) .............................. 101144243 A (51) Int. Cl.
*H04L 29/12* (2006.01)
*H04L 29/06* (2006.01)
*H04M 1/253* (2006.01)

(52) U.S. Cl.
CPC ...... *H04L 65/1096* (2013.01); *H04L 29/12066* (2013.01); *H04L 29/12094* (2013.01); *H04L 61/1511* (2013.01); *H04L 61/1529* (2013.01); *H04M 1/2535* (2013.01)

(58) Field of Classification Search
CPC ................. H04L 65/10–65/1096; H04L 51/28; H04L 61/2076; H04L 61/301; H04L 61/307; H04L 61/1511; H04L 29/06414; H04L 29/06319–29/0638; H04L 29/12094; H04L 29/12066; H04L 61/1529; H04M 3/42–3/567; H04M 7/0006; H04M 7/128; H04M 2203/5063; H04M 1/72519; H04M 15/41–15/56; H04M 1/2535; H04W 48/00

USPC ......................... 370/259–271, 352, 356, 401; 455/414.1, 415–417, 435.1, 518, 519, 455/434; 709/201–207, 224, 227, 229; 379/93.05, 179, 185, 201.02, 201.03, 379/207.05–207.09, 207.16, 252

See application file for complete search history.

(56) References Cited

U.S. PATENT DOCUMENTS

| | | | |
|---|---|---|---|
| 6,847,704 B1 * | 1/2005 | Cherchali et al. ........... | 379/93.05 |
| 7,453,827 B2 * | 11/2008 | Toyoda ........................ | 370/260 |
| 2002/0085542 A1 * | 7/2002 | Bedingfield et al. .......... | 370/352 |
| 2008/0144525 A1 * | 6/2008 | Crockett et al. .............. | 370/254 |
| 2008/0162724 A1 * | 7/2008 | Hietasarka .................... | 709/245 |
| 2008/0181140 A1 * | 7/2008 | Bangor et al. ................ | 370/261 |
| 2008/0247384 A1 * | 10/2008 | Arauz-Rosado et al. ...... | 370/352 |
| 2009/0010250 A1 * | 1/2009 | Ganesan et al. .............. | 370/352 |
| 2009/0022299 A1 * | 1/2009 | Bakshi et al. ............. | 379/220.01 |
| 2009/0106453 A1 * | 4/2009 | Miura .......................... | 709/245 |
| 2009/0215463 A1 * | 8/2009 | Satake ......................... | 455/445 |
| 2010/0075673 A1 * | 3/2010 | Colbert et al. ............. | 455/435.1 |
| 2010/0157988 A1 * | 6/2010 | Takeuchi ..................... | 370/352 |
| 2011/0007735 A1 * | 1/2011 | Kruithof ...................... | 370/352 |

(Continued)

*Primary Examiner* — Curtis A Alia
*Assistant Examiner* — Ivan O Latorre
(74) *Attorney, Agent, or Firm* — Novak Druce Connolly Bove + Quigg LLP (57) ABSTRACT

A terminal device capable of creating a group for allowing other terminal devices to join the group is provided. When a terminal device not belonging to the group calls a terminal device in the group, any of the terminal devices in the group can answer the call in response a user input. A method for exchanging voice over Internet protocol (VoIP) signaling between the terminal devices within the group is also provided.

8 Claims, 8 Drawing Sheets

(56) References Cited

U.S. PATENT DOCUMENTS

2011/0228761 A1* 9/2011 Miyata et al. ............... 370/352
2012/0289227 A1* 11/2012 Dhodapkar ................ 455/435.1
2013/0070912 A1* 3/2013 Parandekar et al. ....... 379/88.05
2013/0294443 A1* 11/2013 Kahn ............................ 370/352

* cited by examiner

TERMINAL DEVICE AND METHOD FOR EXCHANGING VOIP SIGNALING

BACKGROUND

1. Technical Field

The present disclosure relates to voice over Internet protocol (VoIP) communications and, particularly, to a terminal device and a method for exchanging VoIP signaling.

2. Description of Related Art

In a VoIP communication system, a number of terminal devices may be combined to create a group. Thus, when a VoIP phone A in a group is called by another VoIP phone B not belonging to the group, and the user of the VOIP phone A is not available to answer the call, another user can answer the VOIP phone A via a VoIP phone C in the group. However, to create the group, a number of hardware elements is needed, which increases cost.

Therefore, it is desirable to provide a terminal device and a method to resolve the above shortcomings.

BRIEF DESCRIPTION OF THE DRAWINGS

Many aspects of the present disclosure should be better understood with reference to the following drawings. The units in the drawings are not necessarily drawn to scale, the emphasis instead being placed upon clearly illustrating the principles of the present disclosure. Moreover, in the drawings, like reference numerals designate corresponding portions throughout the several views.

DETAILED DESCRIPTION

Embodiments of the present disclosure will be described with reference to the accompanying drawings.

Figure 1:
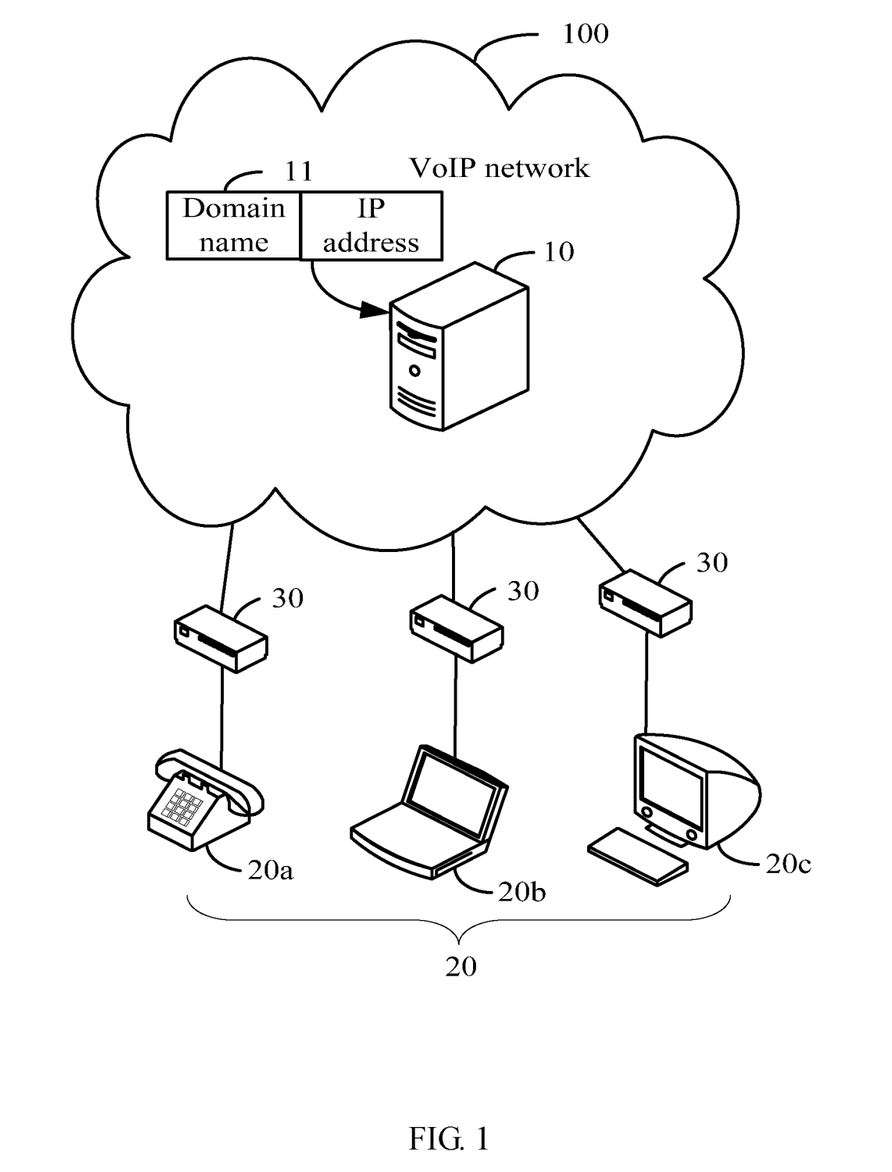
FIG. 1 is a schematic diagram of a VoIP system accordance with an exemplary embodiment.

Referring to FIG. 1, in an embodiment of the present disclosure, a voice over Internet protocol (VoIP) communication system 100 includes a dynamic domain name service (DDNS) server 10, a number of terminal devices 20, and an integrated access device 30. In this embodiment, the terminal devices 20 include terminal devices 20a, 20b, and 20c. The integrated access device 30 connects the terminal devices 20a, 20b, 20c to the DDNS server 10. In alternative embodiments, when the terminal devices 20a, 20b, 20c can directly access the DDNS server 10, the terminal devices 20a, 20b, 20c can be directly connected to the DDNS server 10 and not require the integrated access device 30.

The DDNS server 10 stores a mapping table 101 recording a domain name and an IP address of each terminal device when each terminal device registers with the DDNS server 10. In this embodiment, the IP address of each of the terminal devices 20a, 20b, 20c is unique, for example, the IP address of the terminal device 20a is 60.199.244.6, the IP address of the terminal device 20b is 10.59.230.60, and the IP address of the terminal device 20c is 119.160.246.23.

Figure 2:
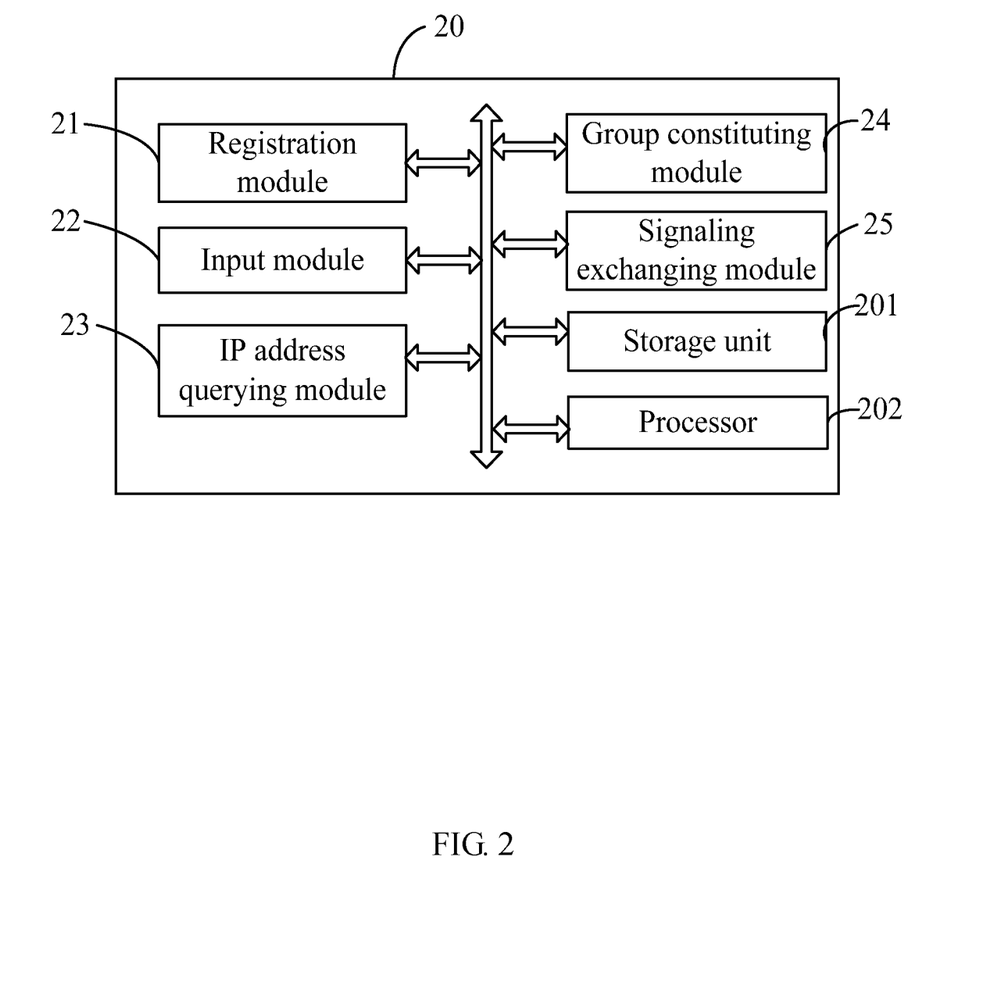
FIG. 2 is a block diagram of a terminal device of the VoIP system shown in FIG. 1.
Figure 3:
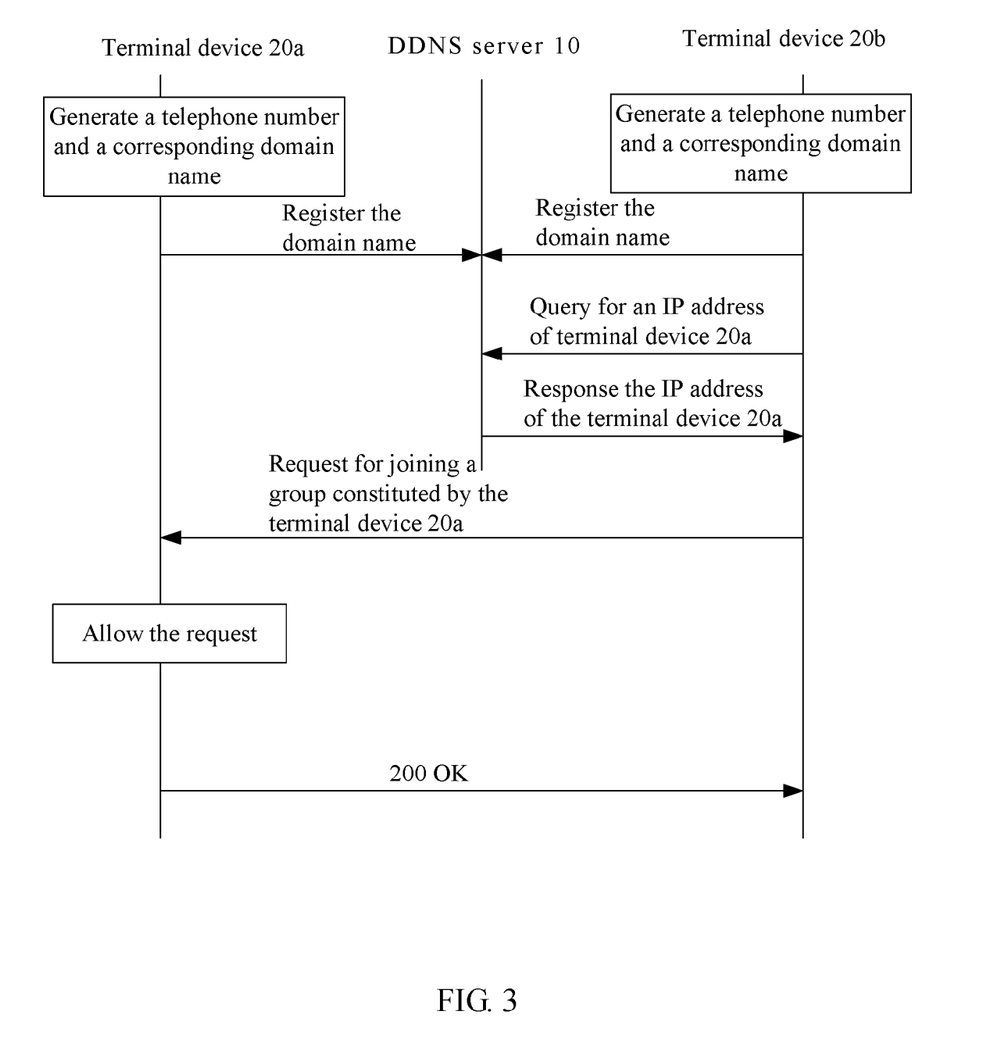
FIG. 3 is a transport diagram of a method for terminal devices creating a group.

Referring to FIGS. 2-3, each terminal device 20 includes a storage unit 201, a processor 202, and a number of functional modules. The storage unit 201 may be a flash memory, a cache or other computerized memory device. In this embodiment, the number of function modules includes a registration module 21, an input module 22, an IP address querying module 23, a group creating module 24, and a signaling exchanging module 25. The modules 21-25 may comprise computerized code in the form of one or more programs that are stored in the storage unit 201. The computerized code includes instructions that are executed by the processor 202 to provide functions for the modules 21-25.

The registration module 21 generates a telephone number of the terminal device 20, and generates a domain name corresponding to the telephone number of the terminal device 20 according to a preset rule. The registration module 21 further transmits the domain name and the IP address of the terminal device 20 to the DDNS server 10 to register with the DDNS server 10. In one embodiment, the registration module 21 converts a media access control (MAC) address of the terminal device 20 into the telephone number of the terminal device 20 according to a hash function. The preset rule is the generation of a domain name according to a combination of a telephone number and a preset string. In one embodiment, the preset string may be ".myvoip.net".

For example, if the MAC addresses of the terminal devices 20a, 20b, 20c are respectively 11:12:31:23, 11:45:64:56, and 11:78:97:89, then the telephone numbers of the terminal devices 20a, 20b, 20c are respectively 123123, 456456, and 789789. If a corresponding area code is 0944, then the final telephone number of the terminal devices 20a, 20b, 20c are respectively 094412312, 0944456456, and 0944789789. Accordingly, the domain names of the terminal devices 20a, 20b, 20c may be 0944123123.myvoip.net, 0944456456.myvoip.net, and 0944789799.myvoip.net, respectively.

After the terminal devices 20a, 20b, 20c register in the DDNS server 10, the terminal devices 20a, 20b, and 20c can be combined to create a group. When a terminal device not belonging to the group calls one of the terminal devices in the group, other terminal devices within the group can be employed to answer the call. The detail procedure of creating the group will be described.

The group creating module 24 automatically creates a group in response to user input (e.g. a press on a special button), and determines whether to allow other terminal devices 20 to join the group when receiving a request to join the group from the other terminal devices 20. The terminal device 20b is taken as an example to illustrate how the other terminal devices 20 join the group. First, the terminal device 20b receives an input telephone number 0944123123 which is the telephone number of the terminal device 20a, and determines that the terminal device 20b itself is wanted by users to join the group created by the terminal device 20a when an input for creating the group is input or confirmed by users (e.g. a press on a special button after input the telephone number of the terminal device 20a). The IP address querying module 23b of the terminal device 20b then obtains the telephone number 0944123123 of the terminal device 20a, generates the domain name 0944123123.myvoip.net, and queries the DDNS server 10 for an IP address corresponding to the domain name 0944123123.myvoip.net. The processor 101 of the DDNS server 10 finds the domain name 0944123123.myvoip.net in the mapping table, and sends the IP address 60.199.244.6 corresponding to the domain name 0944123123.myvoip.net to the terminal device 20*b*.

After receiving the IP address from the DDNS server 10, the group creating module 24*b* of the terminal device 20*b* generates a request to join the group created by the terminal device 20*a* and sends the request to the terminal device 20*a* according to the IP address received from the DDNS server 10. The request to join the group includes the domain name and the IP address of the terminal device 20*b*.

When receiving a request from the terminal device 20*b*, the group creating module 24*a* of the terminal device 20*a* prompts users to select whether or not to allow the terminal device 20*b* to join the group, according to input by the users prompted, for example, a selection interface (not shown) is displayed for users to make a selection. If a rejection option is selected, the group creating module 24 transmits a rejection information to the terminal device 20*b*. If an accept option is selected, the group creating module 24 adds the terminal device 20*b* to the group by storing the domain name and the IP address of the terminal device 20*b*, and simultaneously sends a confirmation signal to the terminal device 20*b* to inform the terminal device 20*b* that the request is allowed. In this embodiment, the confirmation signal includes the domain names and the IP addresses of all terminal devices in the group. After receiving the confirmation signal from the terminal device 20*a*, the group creating module 24*b* of the terminal device 20*b* stores the domain names and the IP addresses of the terminal devices in the group. At this point, the terminal device 20*b* has successfully joined the group created by the terminal device 20*a*. With such configuration, a group including different terminal devices can be created by software without any hardware elements, which accordingly decreases cost.

Figure 4:
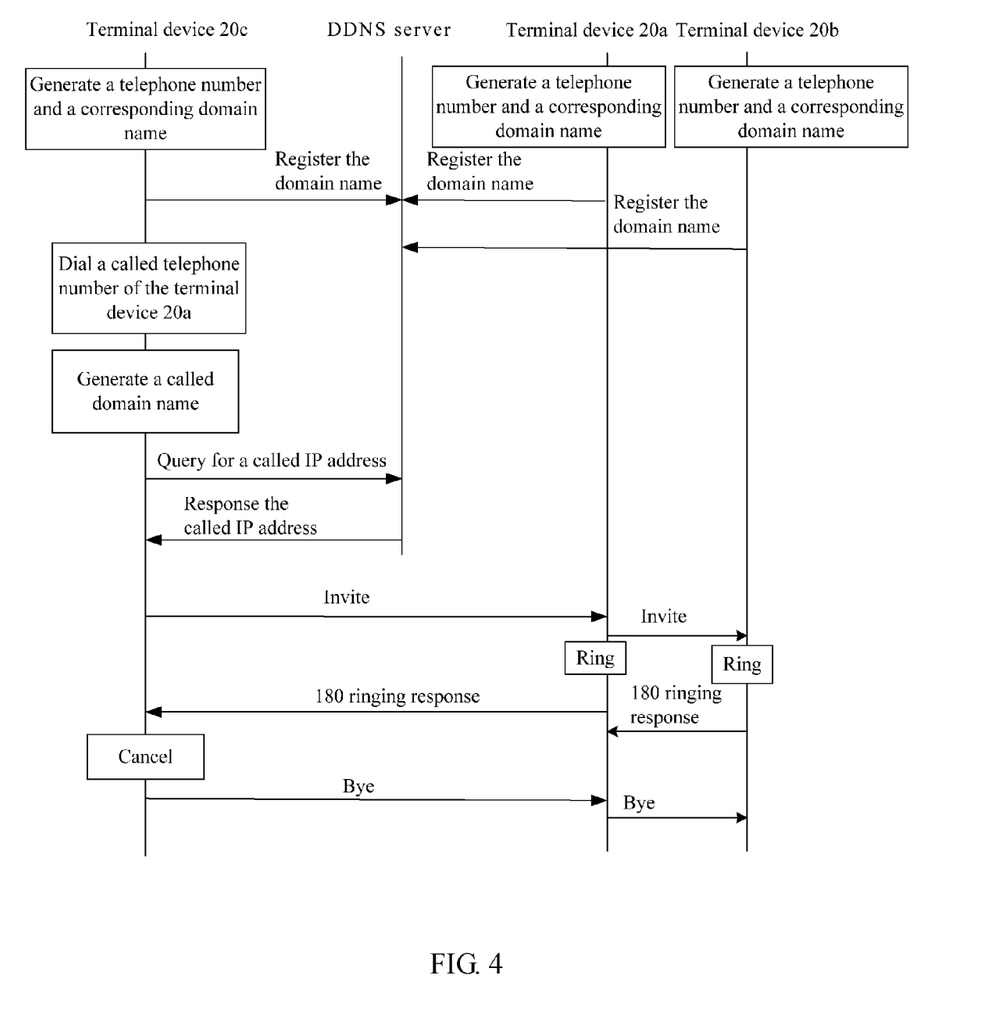
FIG. 4 is a transport diagram to illustrate how to initiate a call.
Figure 5:
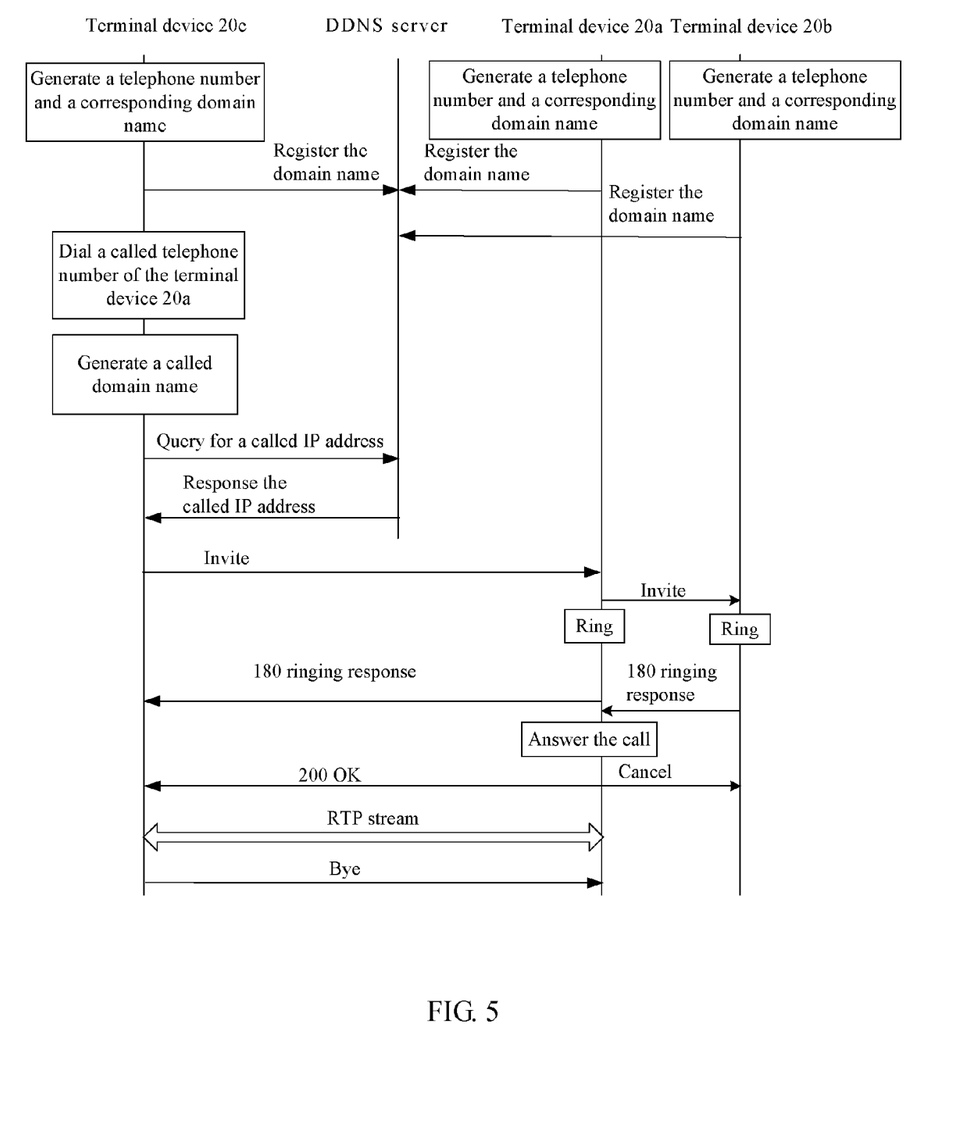
FIG. 5 is a transport diagram to illustrate how to initiate and answer a call in a first situation.
Figure 6:
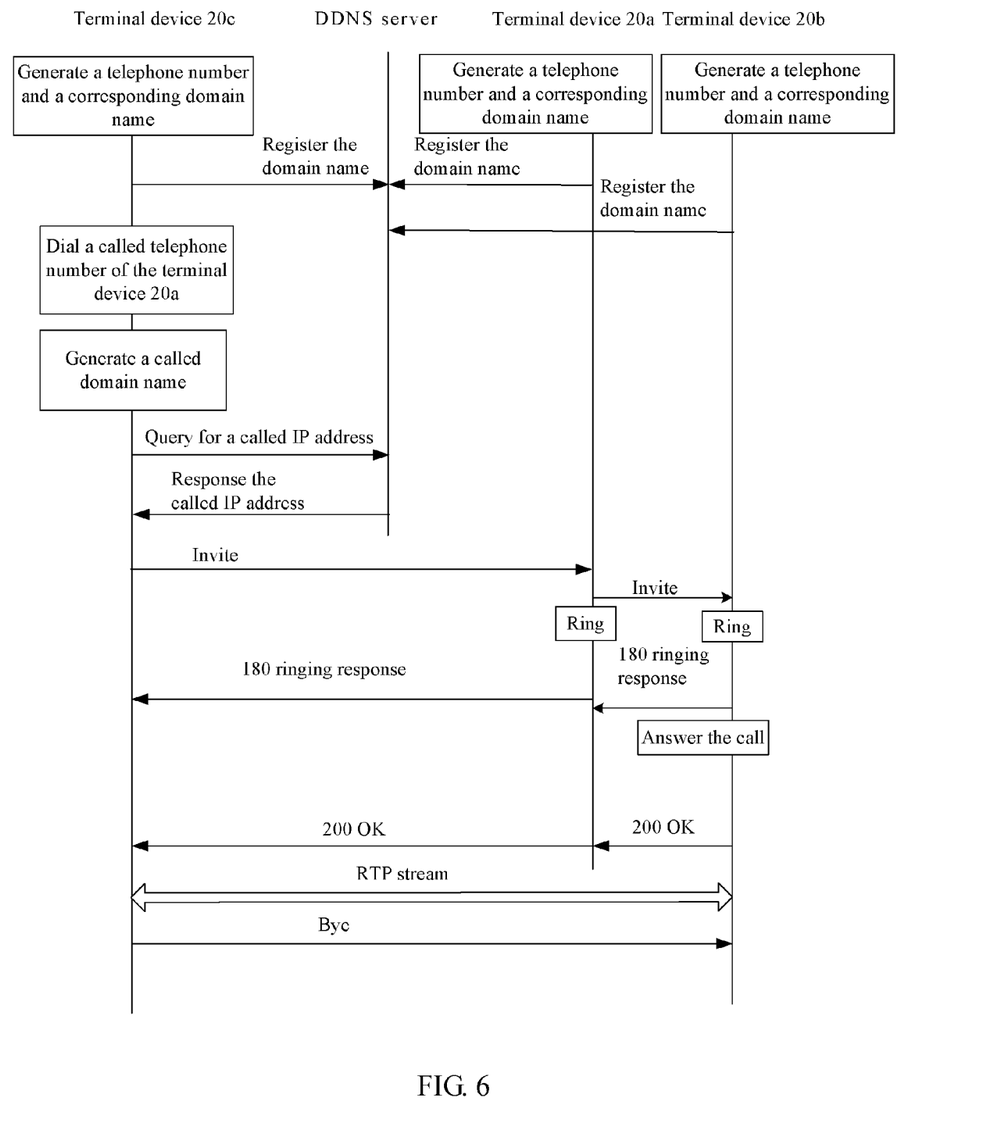
FIG. 6 is a transport diagram to illustrate how to initiate and answer a call in a second situation.

FIGS. 4-6 illustrate how to answer a call within a group. Simply for illustration, the terminal devices 20*a* and 20*b* are taken as being in a group, and the terminal device 20*c* is taken as not being in the group. When a user dials the telephone number of the terminal device 20*a* via the terminal device 22*c*, the IP querying module 23*c* of the terminal device 20*c* generates a domain name corresponding to the called telephone number according to the preset rule. The IP querying module 23*c* then queries the DDNS server 10 for the IP address corresponding to the domain name of the called terminal device 20*a*.

After receiving the IP address of the called terminal device 20*a* from the DDNS server 10, the signaling exchanging module 25*c* of the terminal device 20*c* transmits a first invitation to the called terminal device 20*a*. The first invitation includes an identification of the calling terminal device 20*c*, such as the IP address of the terminal device 20*c*.

After receiving the first invitation from the terminal device 20*c*, the signaling exchanging module 25*a* transmits a ringing response "180 ringing" to the terminal device 20*c* to inform the terminal device 20*c* that the terminal device 25*a* is ring, and simultaneously transmits a second invitation to the terminal device 20*b* in the group to inform the terminal device 20*b* that a call has been initiated by the terminal device 20*c*.

After receiving the second invitation from the terminal device 20*a*, the terminal device 20*b* transmits a ring response "180 ringing" to the terminal device 20*a* to inform the terminal device 20*a* that the terminal device 20*b* is ring. Thus, the terminal devices 20*a* and 20*b* will ring simultaneously to inform the user that there is a call, and a user can answer the call by picking up either of the terminal devices 20*a* and 20*b*.

If the calling terminal device 20*c* transmits a cancel signal "Bye" to the terminal device 20*a* to inform the terminal device 20*a* that the call will be ended before the call is answered, the terminal device 20*a* stops ringing and ends the call, and transmits the Bye signal to the terminal devices 20*b* to inform the terminal device 20*b* to end the call.

Referring to FIG. 5, if a user answers the call using the terminal device 20*a*, the signaling exchanging module 25*a* transmits a confirmation response "200 OK" to the calling terminal device 20*c* to establish a VoIP communication with the calling terminal device 20*c*, and simultaneously the signaling exchanging module 25*a* transmits a cancel signal to the terminal device 20*b* to stop the ringing of the terminal device 20*b*. In this embodiment, the confirmation response "200 OK" includes an identification of the terminal device 20*a* answering the call, such as the IP address of the terminal device 20*a*. When the VoIP communication is ended, the calling terminal device 20*c* transmits a cancel signal "Bye" to the called terminal device 20*a* to end the call, and receives a confirmation response "200 OK" from the called terminal device 20*a*.

Referring to FIG. 6, if a user answers the call using the terminal device 20*b*, the signaling exchanging module 25*b* of the terminal device 20*b* transmits a confirmation response "200 OK" to the terminal device 20*a*. In this embodiment, the confirmation response "200 OK" includes an identification of the terminal device 20*b* answering the call, such as the IP address of the terminal device 20*b*. The terminal device 20*a* transmits the confirmation response "200 OK" to the terminal device 20*c*, and then the terminal device 20*c* establishes a VoIP communication with the terminal device 20*b*.

Figure 7:
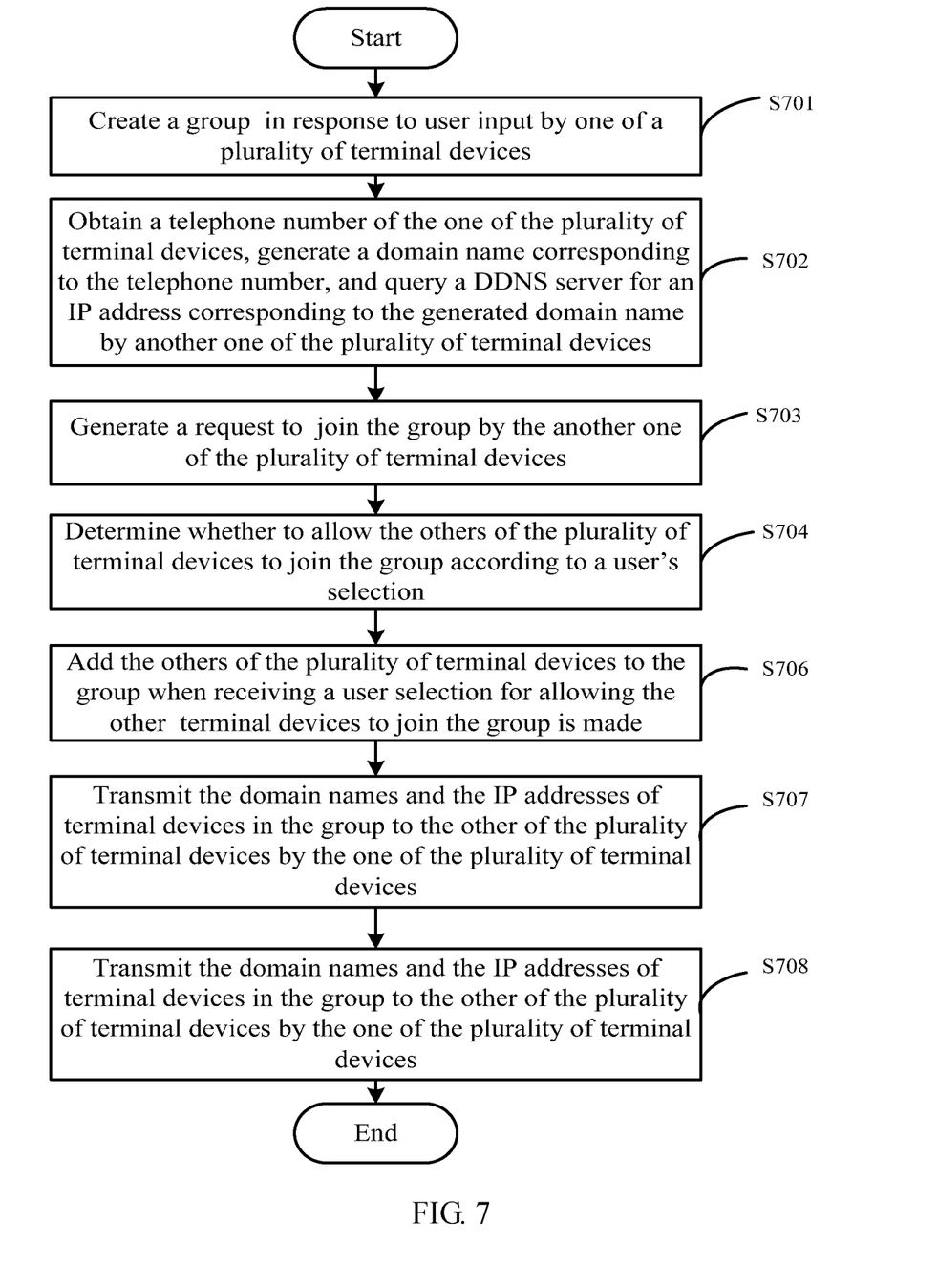
FIG. 7 is a flowchart of a method for creating a group in accordance with an exemplary embodiment.

FIG. 7 is a flowchart of a method for creating a group in accordance with the present disclosure.

In step S701, the terminal device 20*a* creates a group in response to user input.

In step S702, the terminal device 20*b* receives an input telephone number which is the telephone number of the terminal device 20*a* in the process of constructing the group, and, when a confirmation input for creating the group is input by users, determines that the terminal device 20*b* itself is wanted by users to join the group being constructed by the terminal device 20*a*. A domain name is generated corresponding to the telephone number according to the preset rule, and the DDNS server 10 is queried for an IP address corresponding to the domain name.

In step S703, the terminal device 20*b* generates a request to join the group created by the terminal device 20*a*, and sends the request to the terminal device 20*a*.

In step S704, the terminal device 20*a* determines whether or not to allow the terminal device 20*b* to join the group according to user selection when receiving the request from the terminal device 20*b*.

In step S705, the terminal device 20*a* adds the terminal device 20*b* to the group by storing the domain name and the IP address of the terminal device 20*b* after a user selection to allow the terminal device 20*b* to join the group is made.

In step S706, the terminal device 20*a* sends a confirmation response to the terminal device 20*b* to inform the terminal device 20*b* that the request is allowed, and the confirmation signal includes domain names and the IP addresses of terminal devices in the group.

In step S707, the terminal device 20*b* stores the received domain names and the IP addresses.

Figure 8:
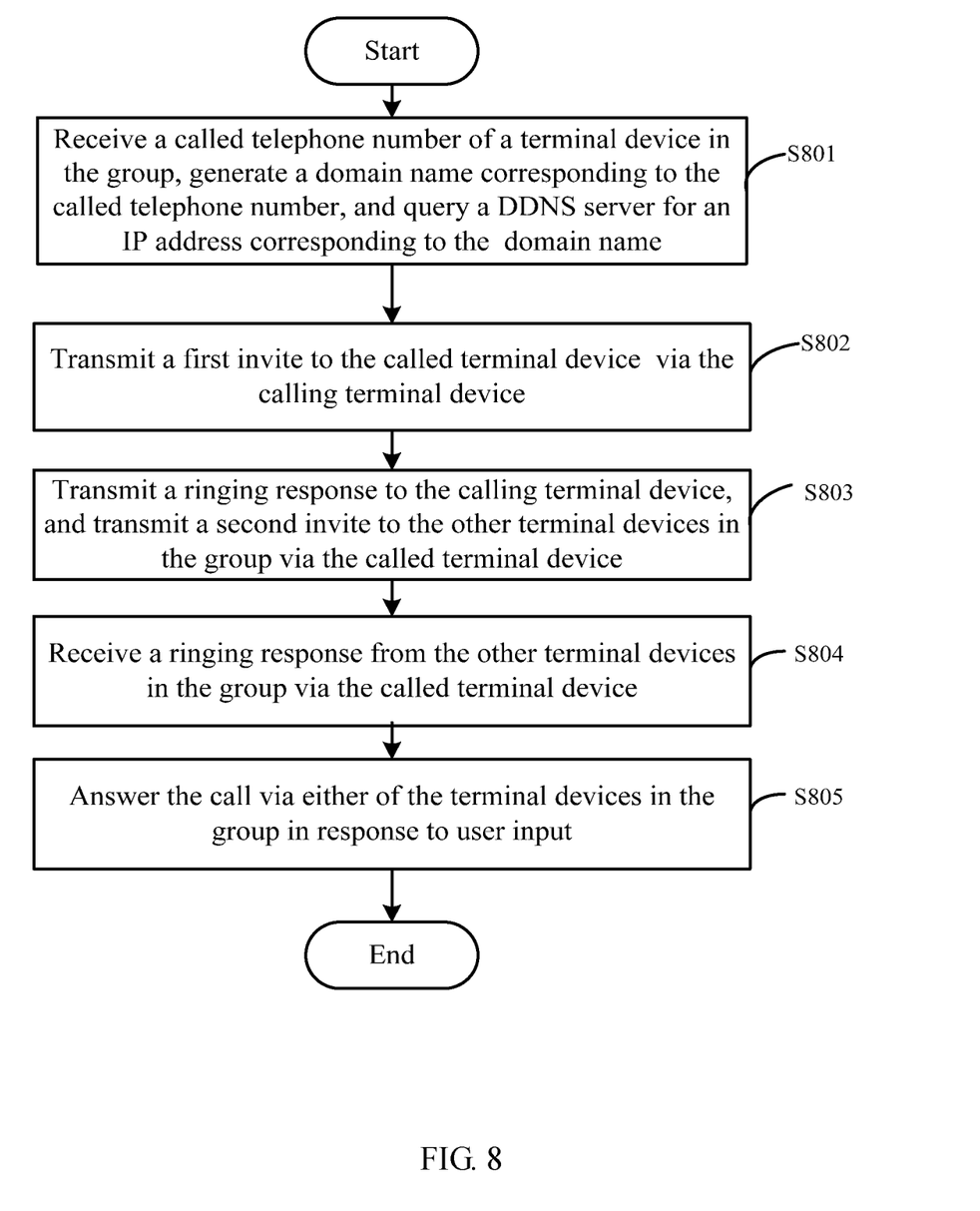
FIG. 8 is a flowchart of a method for answering a call in the group in accordance with an exemplary embodiment.

FIG. 8 is a flowchart of a method for exchanging VoIP signaling in a group in accordance with the present disclosure.

In step S801, the terminal device 20*c* receives an called telephone number of the terminal device 20*a* the user input, where terminal device 20*c* is not in the group, generates a domain name corresponding to the called telephone number according to the preset rule, and queries the DDNS server 10 for an IP address for the called number corresponding to the generated domain name.

In step S802, after receiving an IP address from the DDNS server 10, the calling terminal device 20c transmits a first invitation to the called terminal device 20a.

In step S803, after receiving the first invitation from the calling terminal device 20c, the called terminal device 20a transmits a ring response "180 ringing" to the calling terminal device 20c to inform the terminal device 20c that the terminal device 20a is ring, and simultaneously transmits a second invitation to the terminal device 20b, the other member in the group, to inform the terminal device 20b that a call has been initiated by the terminal device 20c.

In step S804, the terminal device 20b transmits a ring response "180 ringing" to the called terminal device 20a when receiving the second invitation from the called terminal device 20a.

In step S805, either of the terminal devices 20a and 20b in the group can be picked up to answer the incoming call.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A terminal device in communication with a plurality of other terminal devices and a dynamic domain name service (DDNS) server over a voice over Internet protocol (VoIP) network, each of the other terminal devices and the terminal device comprising a registration module operable to transmit a domain name and an IP address to the DDNS server to register in the DDNS server, the terminal device further comprising:
    at least one processor;
    an IP address querying module operable by the processor to obtain an input telephone number, generate a domain name corresponding to the telephone number according to a preset rule, and query the DDNS server for an IP address corresponding to the generated domain name;
    a group creating module operable by the processor to generate a request to join a group created by a terminal device having the input telephone number, and transmit the request to the terminal device having the input telephone number, the request comprising the domain name and the IP address of the terminal device; and
    the group creating module operable by the processor further to create a group in response to user input, determine whether or not to allow one of the other terminal devices to join the group according to input by user prompted when receiving a request to join the group from the one of the other terminal devices, add the one of the other terminal devices to the group by storing the domain name and the IP address of one of the other terminal devices when user selection for allowing the one of the other terminal devices to join the group is made, and further to transmit the domain names and the IP addresses of terminal devices in the group to the one of the other terminal devices; and
    a signaling exchanging module operable by the processor to receive a first invitation for establishing a VoIP communication from a calling terminal device which not belonging to the group, and transmit a second invitation to the other terminal devices in the group to inform the other terminal devices that a call is initiated;
    wherein the signaling exchanging module further to transmit a confirmation response to the calling terminal device to establish the VoIP communication, and transmit a cancel signal to the other terminal devices in the group to inform the other terminal devices to stop ringing when the terminal device answers the call.

2. The terminal device as described in claim 1, wherein the group creating module is further operable to transmit a confirmation signal to the one of the other terminal devices to inform that the one of the other terminal device has successfully joined the group.

3. A terminal device in communication with a plurality of other terminal devices and a dynamic domain name (DDNS) server over a voice over Internet protocol (VoIP) network, each of the other terminal devices and the terminal device comprising a registration module operable to transmit a domain name and an IP address to the DDNS server to register in the DDNS server, the terminal device further comprising:
    at least one processor;
    an IP address querying module operable by the processor to obtain an input telephone number, generate a domain name corresponding to the telephone number according to a preset rule, and query the DDNS server for an IP address corresponding to the generated domain name; and
    a group creating module operable by the processor to generate a request to join a group created by a terminal device having the input telephone number, and transmit the request to the terminal device having the input telephone number, the request comprising the domain name and the IP address of the terminal device; and
    the group creating module operable by the processor further to determine whether or not to allow one of the other terminal devices to join the group according to input by user prompted when receiving a request to join the group from the one of the other terminal devices; and
    a signaling exchanging module operable by the processor to receive a first invitation for establishing a VoIP communication from a calling terminal device which not belonging to the group, and transmit a second invitation to the other terminal devices in the group to inform the other terminal devices that a call is initiated;
    wherein the signaling exchanging module further to transmit a confirmation response to the calling terminal device to establish the VoIP communication, and transmit a cancel signal to the other terminal devices in the group to inform the other terminal devices to stop ringing when the terminal device answers the call.

4. The terminal device as described in claim 3, wherein the group creating module is further operable by the processor to receive the domain names and the IP addresses of other terminal devices in the group from the terminal device creating the group, and store the received domain names and the IP addresses.

5. The terminal device as described in claim 4, the signaling exchanging module operable by the processor further to transmit a ringing response to a called terminal device in the same group and ring when receiving an invitation from the called terminal device for informing that a call is initiated by a terminal device not being in the same group.

6. The terminal device as described in claim 5, wherein the signaling exchanging module is further operable to receive a cancel signal from the called terminal device and stop ringing when the called terminal device answers the call.

7. A method for exchanging voice over Internet protocol (VoIP) signaling of one of a plurality of terminal devices and a dynamic domain name service (DDNS) server over a VoIP network, each of the terminal devices transmitting a domain name and an IP address to the DDNS server to register in the DDNS server, the method comprising:

creating a group by one of the plurality of terminal devices in response to user input;

obtaining the telephone number of the one of the plurality of terminal devices, generating a domain name corresponding to the telephone number according to a preset rule, and querying the DDNS server for an IP address corresponding to the generated domain name by another one of the plurality of terminal devices;

generating a request to join a group created by a terminal device having the obtained telephone number, and transmit the request to the terminal device having the obtained telephone number, the request comprising the domain name and the IP address of the another one of plurality of terminal devices;

determining whether or not to allow the other of the plurality of terminal devices to join the group according to user selection when receiving the request to join the group from the other of the plurality of terminal devices, and adding the other of the plurality of terminal devices to the group by storing the domain name and the IP address of the other of the plurality of terminal devices when receiving a user selection for allowing the other of the plurality of terminal devices to join the group is made by the one of the plurality of terminal devices;

transmitting the domain names and the IP addresses of terminal devices in the group to the other of the plurality of terminal devices by the one of the plurality of terminal devices;

storing the received domain names and the IP addresses by the other of the plurality of terminal devices;

receiving a first invitation for establishing a VoIP communication from a calling terminal device which not belonging to the group;

transmitting a second invitation to the other terminal devices in the group to inform the other terminal devices that a call is initiated; and transmitting a confirmation response to the calling terminal device to establish the VoIP communication, and transmitting a cancel signal to the other terminal devices in the group to inform the other terminal devices to stop ringing when the terminal device answers the call.

8. The method as described in claim 7, further comprising:

receiving an input called telephone number which belongs to one of the terminal device in the group, generating a domain name corresponding to the called telephone number according to the preset rule, and querying the DDNS server for an IP address corresponding to the called domain name via a calling terminal device which does not belong to the group;

transmitting a first invitation to the called terminal device according to the IP address received from the DDNS server via the calling terminal device;

transmitting a ringing response to the calling terminal device, and transmitting a second invitation to the other terminal devices in the group to inform the other terminal devices in the group that a call is initiated by the calling terminal device via the called terminal device when the called terminal device receiving the first invite;

receiving a ringing response from the other terminal devices in the group via the called terminal device; and answering the call via either of the terminal devices in the group in response to user input.

* * * * *